United States Patent [19]
Terasawa

[11] Patent Number: 4,510,510
[45] Date of Patent: Apr. 9, 1985

[54] INKJET PRINTER

[75] Inventor: Koji Terasawa, Mitaka, Japan

[73] Assignee: Canon Kabushiki Kaisha, Tokyo, Japan

[21] Appl. No.: 481,744

[22] Filed: Apr. 4, 1983

[30] Foreign Application Priority Data

Apr. 13, 1982 [JP] Japan .......... 57-61528
Apr. 13, 1982 [JP] Japan .......... 57-61529
Apr. 13, 1983 [JP] Japan .......... 57-61530

[51] Int. Cl.$^3$ .......... G01D 15/18
[52] U.S. Cl. .......... 346/140 R
[58] Field of Search .......... 346/140, 75

[56] References Cited

U.S. PATENT DOCUMENTS 4,320,406 3/1982 Heinzl .......... 346/140
4,383,263 5/1983 Ozawa .......... 346/140
4,394,669 7/1983 Ozawa .......... 346/140
4,403,233 9/1983 Terasawa .......... 346/140

*Primary Examiner*—Joseph W. Hartary
*Attorney, Agent, or Firm*—Fitzpatrick, Cella, Harper & Scinto

[57] ABSTRACT

An inkjet printer has a plurality of storing members for storing inks of different colors, a plurality of recording units for injecting the inks stored in the storing member, a plurality of air suction paths which are disposed in correspondence with the storing member for drawing the air in the storing member and which are independent from each other and do not communicate with each other, suction unit for drawing the air in the storing member through the air suction paths in the suction mode and for sealing the air suction paths and for sealing communication between the air suction paths in the non-suction mode.

9 Claims, 10 Drawing Figures

INKJET PRINTER

BACKGROUND OF THE INVENTION

1. Field of the Invention

The present invention relates to an inkjet printer and a suction apparatus used therefor.

2. Description of the Prior Art

In a closed ink tank, the amount of air inside increases due to evaporation of the ink or the like, and ink may not then be properly supplied. Therefore, the increased amount of air must be exhausted outside the tank. When the air is exhausted by a negative pressure suction source, ink is exhausted together with the air. For this reason, if air suction tubes for ink tanks of respective colors communicate with each other, the inks diffuse and mix with each other. In order to prevent this, a conventional arrangement as shown in FIG. 1 has been proposed. Referring to FIG. 1, a recording head 1 has an integral unit of a plurality of subtanks storing inks of different colors therein. Each subtank has an inkjet nozzle. Main tanks 2 (only one is shown in the figure for the sake of simplicity) are respectively connected to the subtanks. A cap 3 seals the surface of the recording head 1 in which the nozzles are embedded and serves to prevent drying of the inks. A negative pressure suction source 4 has independent air suction tubes 5 which are respectively connected to the subtanks.

With the arrangement as described above wherein the air suction tubes 5 are arranged for the respective subtanks, mixing of different color inks may be prevented to a certain degree. However, since the different color inks are still mixed in the negative pressure suction source, the inks diffuse and mix with each other as they are drawn into the air suction tubes 5.

When air layers are present in the air suction tubes 5, the different color inks mix with each other due to formation of an ink head or a change in the air volume, which are respectively caused by inclination of the air layers or changes in temperature.

In this manner, the conventional arrangement requires a separate negative pressure suction source for ink suction in addition to a negative pressure suction source for air suction. Furthermore, an air suction tube must be connected to each subtank. This has prevented easy mounting of the arrangement on the printer, and has thus prevented a compact arrangement. When the recording head 1 moves together with a carriage, the air suction tubes provide a resistance and adversely affect the movement of the recording head 1.

SUMMARY OF THE INVENTION

It is an object of the present invention to provide an inkjet printer which may not cause mixing of inks of different colors.

It is another object of the present invention to provide an inkjet printer which is capable of high-speed printing.

It is another object of the present invention to provide an inkjet printer which allows each mounting.

It is another object of the present invention to provide an inkjet printer of a simple structure.

The above and other objects of the present invention will become apparent from the following detailed description when taken in conjunction with the accompanying drawings.

BRIEF DESCRIPTION OF THE DRAWINGS

FIGS. 2 to 6 show a suction apparatus according to a first embodiment of the present invention, wherein FIG. 2 is a perspective view showing the outer appearance of the first embodiment;

FIG. 3 is a partially sectional view of the FIG. 2;

FIG. 5 is a sectional view showing details of a negative pressure suction source used in the embodiment;

FIG. 6 is a timing chart for explaining the mode of operation of the embodiment;

FIGS. 7 to 9 show a suction apparatus according to a second embodiment of the present invention, wherein FIG. 7 is a partially sectional perspective view of the embodiment;

FIG. 8 is a sectional view of a sealing portion of a piston; and

FIG. 9 is a top view of a pump.

DETAILED DESCRIPTION OF THE PREFERRED EMBODIMENTS

Figure 1:
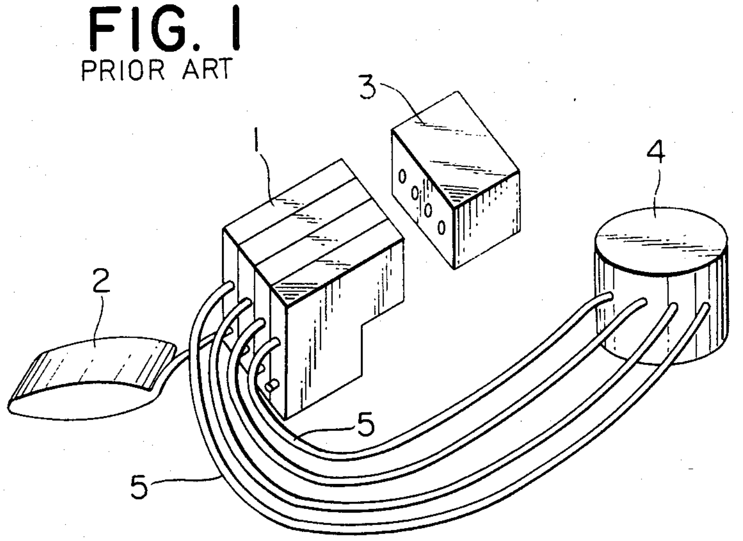
FIG. 1 PRIOR ART
FIG. 1 is a schematic view showing the arrangement of a conventional device.
Figure 2:
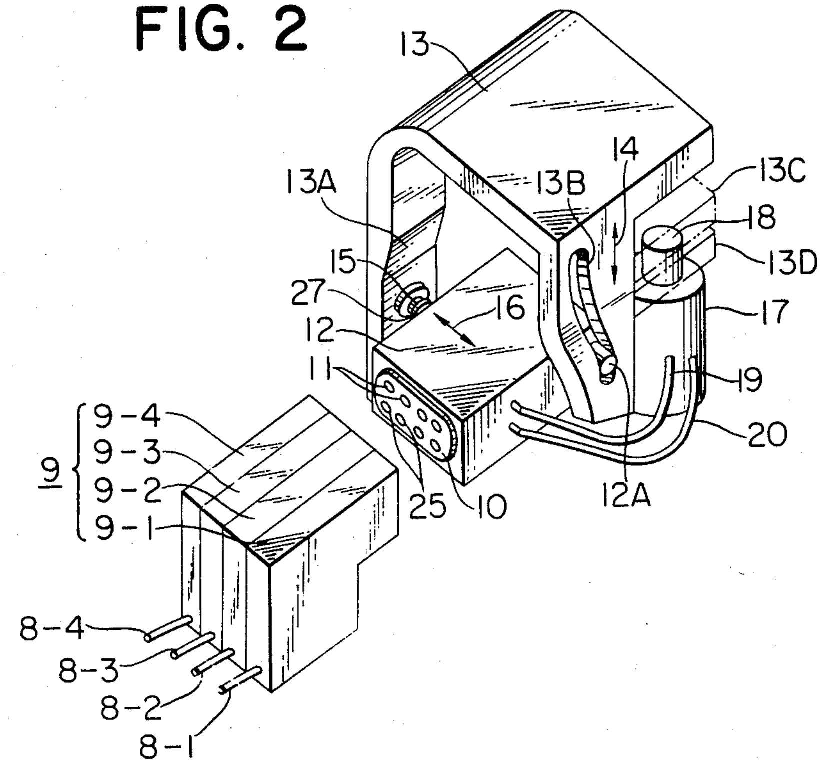

FIGS. 2 to 6 show the first embodiment of the present invention. Referring to FIG. 2, a recording head 9 has ink supply tubes 8-1 to 8-4. A capping 12 having ink suction paths 11 and air suction paths 25 in an elastic cap 10 opposes the recording head 9. A pin 12A protrudes from the side surface of the capping 12. Suction path sealing mechanisms (A) and (B) are incorporated within the capping 12. A lever 13 moves vertically in the directions indicated by arrow 14. By the engagement of a groove cam 13B formed in the lever 13 with the pin 12A, the vertical movement of the lever 13 is converted to transverse movement of the capping 12 so as to control its attachment to or separation from the recording head 9. The lever 13 further has a cam 13A. The vertical movement of the cam 13A controls the movement of an ink suction hollow shaft 15 and an air suction hollow shaft 26 (FIG. 3) of the suction path sealing mechanisms in the directions indicated by arrow 16. A negative pressure suction source 17 is arranged immediately below one end of the lever 13. The vertical movement of the lever 13 vertically moves a piston 18 of the negative pressure suction source 17. The negative pressure suction source 17 and the capping 12 are connected by an ink suction tube 19 and an air suction tube 20, thereby transmitting a negative pressure.

Figure 3:
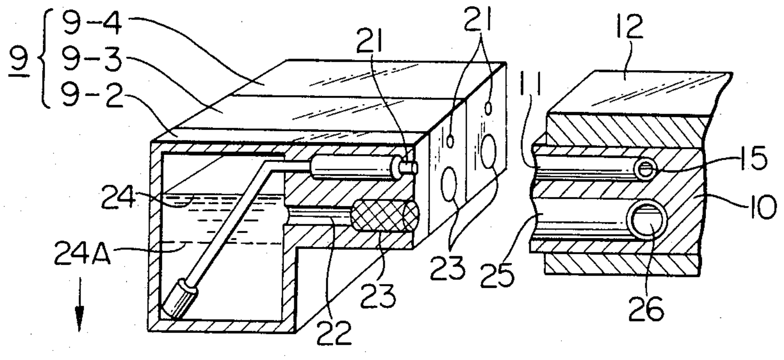

FIG. 3 shows a partially sectional view of the apparatus shown in FIG. 2. In the recording head 9, four subtanks 9-1, 9-2, 9-3 and 9-4 are arranged next to each other in the direction parallel to the surface of a printing paper sheet (printing direction). The respective subtanks store inks of different colors and have inkjet nozzles 21, air suction holes 22, and resistance filters 23 at the distal ends of the holes 22. The inkjet nozzles 21 are of so-called ink-on-demand type; they inject inks in response to drive signals supplied from a printer circuit (not shown). The resistance filters 23 serve to keep the subtanks in a substantially sealed state, and to extract excess air in the subtanks, thereby keeping the ink levels constant. In order to perform these two functions, each resistance filter 23 comprises a material such as a membrane filter having pores of about 5 to 10μ 'diameter. The resistance filters 23 serve to allow permeation of air only when no ink is attached to them, but do not allow permeation of air when a large quantity of ink is adhered to them. As shown in FIG. 3, when the ink level is kept at a normal ink level 24, the resistance filter 23 is soaked with the ink and therefore seals the interior of the subtank. When the amount of air in the subtank increases due to evaporation of the ink or the like, the ink level falls to reach a level 24A. Then, the resistance filter 23 is no longer soaked with the ink and the air can permeate therethrough to a certain degree. The capping 12 has four ink suction paths 11 and four air suction paths 25 in correspondence with the respective nozzles and air suction holes, respectively. The four ink suction paths 11 and respectively connected to the ink suction hollow shaft 15 inside the capping 12. The four air suction paths 25 are respectively connected to the air suction hollow shaft 26 inside the capping 12.

Figure 4A:
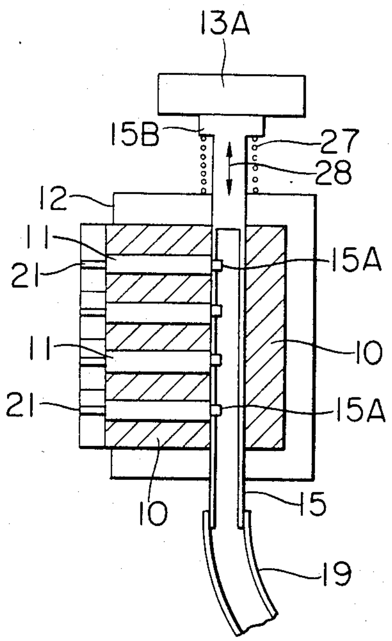
FIG. 4A is a sectional view of a suction path sealing mechanism.
Figure 4B:
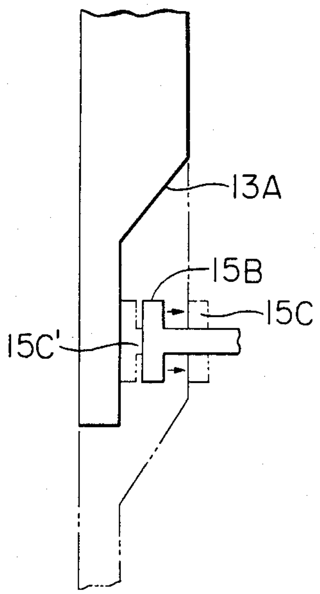
FIG. 4B is a partial view showing the relationship between the vertical movement of an opening/closing cam and a hollow shaft.

FIG. 4A shows a section of the ink suction hollow shaft 15.

The ink suction hollow shaft 15 has notches 15A corresponding to the respective ink suction paths 11. The open end of the shaft 15 communicates with the negative pressure suction source by means of the ink suction tube 19. In the state shown in FIG. 4A, the cam 13A of the lever 13 urges a contact member 15B of the shaft 15 to a position 15C in FIG. 4(B) so as to inject inks from the respective nozzles 21. When the contact member 15B of the shaft 15 returns to a position 15C' by means of a spring 27 upon upward movement of the lever 13, the respective ink suction paths 11 are sealed. More specifically, since the hollow shaft 15 moves upward in the direction indicated by arrow 28, the notches 15A become misaligned with the ink suction paths 11 so that the ink suction paths 11 are sealed. Similar effects may also be obtained with a mechanism in which the hollow shaft 15 pivots to seal the ink suction paths 11.

Although not shown in the figure, the air suction hollow shaft 26 is of the same configuration as that of the ink suction hollow shaft 15. More specifically, the air suction hollow shaft 26 has notches for communicating four air suction paths 25 with the negative pressure suction source, a contact member for engaging with the cam 13A of the lever 13, and a spring for urging the contact member against the cam 13A. When the lever 13 is moved downward, the respective air suction paths 25 communicate with the negative pressure suction source so as to draw air through the filters 23. At this time, a small amount of ink is also drawn through the filters 23. When the lever 13 is returned to the position shown in FIG. 2, each air suction path 25 is sealed and mixing of inks between the respective air suction paths 25 is prevented. When the lever 13 is moved downward, the ink suction paths 11 are first connected to the negative pressure suction source. However, it is apparent that the air suction paths 25 may be connected with the negative pressure suction source as the ink suction paths 11 are connected thereto, by suitably selecting the positions or sizes of the notches.

Figure 5:
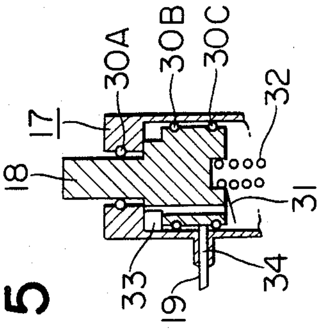

FIG. 5 shows the negative pressure suction source 17. The negative pressure suction source 17 comprises a piston 18 which is vertically movable therein; O-rings 30A, 30B and 30C for providing a hermetic seal; a valve 31 which is open during the suction period; a spring 32 having a biasing force for urging the piston 18 upward; and pump suction openings 34 formed at positions such that they can communicate with a negative pressure space 33 formed when the piston 18 is moved downward. One end of each of the ink suction tube 19 and of the air suction tube 20 is connected to the pump suction openings 34. With the negative pressure suction source 17 of this structure, when the lever 13 is moved in the downward direction indicated by arrow 14, the pin 12A formed integrally with the capping 12 moves forward in the cam 13B so as to urge the elastic cap 10 against the distal end surface of the recording head 9 on which the nozzles 21 and air suction holes 22 are formed. Thereafter, when the piston 18 of the negative pressure suction source 17 is urged by the lever 13 to expand the space 33 and to communicate it with the pump suction openings 34, a negative pressure is established in the hollow shafts 15 and 26. Thereafter, when the cam 13A returns to the position shown in FIG. 4A and the ink suction paths 11 and the air suction paths 25 are connected to the negative pressure suction source, the inks and air are drawn by suction to remove the excess air in the nozzles which is the cause of defective printing. When the amount of air in one of the subtanks is great, that is, when the ink level in the subtank in FIG. 3 is at the level 24A or the like, the filter 23 is not soaked with ink. Therefore, the air in the subtank can permeate through the filter 23 so that the ink level in the subtank can return to the normal ink level 24. In contrast to this, when the amount of air in the subtank is normal, the filter 23 is soaked with ink and does not substantially allow the air to permeate therethrough. Thus, the ink level is kept substantially at the normal ink level 24. More ink in an amount corresponding to the amount of drawn air is supplied to the subtank from the main tank (not shown).

When the lever 13 is moved to its lowermost position indicated by a dotted line 13D in FIG. 2 to as to draw the air and the inks and is then stopped, the piston 18 is returned to its original position by the spring 32 and the lever 13 is also returned to a position indicated by alternate-long-and-two-short dashed line 13C. Since the cam 13A moves upward, the ink suction hollow shaft 15 moves to the position 15C in FIG. 4B. Then, the ink suction paths 11 are sealed, and the air suction hollow shaft 26 also moves to a position to seal the air suction paths 25. On the other hand, when the lever 13 moves to the position 13C, the contact members of the shafts 15 and 26 contact the linear portions of the groove cam 13B. Since the capping 12 is in a state to seal the distal end surface of the head 9 and the biasing force of the spring 32 no longer acts on the lever 13, the lever 13 stops at this position. When the piston 18 is moved downward to draw the air and the piston 18 is thereafter released, the capping 12 seals the distal end of the head 9. Furthermore, since the ink suction hollow shaft 15 and the air suction hollow shaft 26 seal the ink suction paths 11 and the air suction paths 25, respectively, the inks may not mix with each other in this state.

The ink suction paths 11 and the air suction paths 25 are sealed in the state shown in FIG. 5, that is, in the state wherein the negative pressure established in the space 33 is maintained in the respective tubes. The respective ink and air suction paths 11 and 25 are also sealed in the state wherein pump suction openings 34 are located between the O-rings 30B and 30C. The inks in the ink suction tube 19 and the air suction tube 20 do not flow in the reverse direction, so that mixed inks may not contaminate the ink suction paths 11 and the air suction paths 25.

In order to open the capping 12, the lever 13 is pressed to the position shown in FIG. 2 by an appropriate means (not shown).

Figure 6:
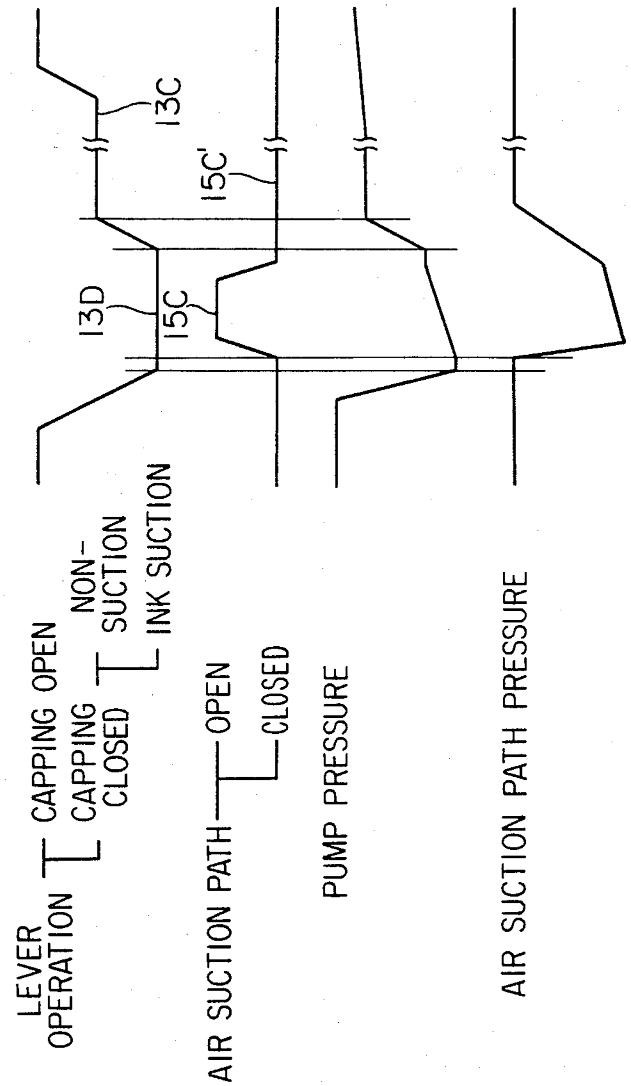

FIG. 6 shows the suction operation as described above. When the capping 12 seals the distal end of the head, the suction operation is not yet started. Thereafter, when the lever 13 is pressed, the ink is drawn by suction, and drawing of the air is started slightly after that of the ink. When the lever 13 is released after it has reached its lowermost position 13D, the lever 13 is moved upward by the spring 32. At this time, the negative pressure acting on the ink suction paths 11 and the air suction paths 25 is maintained. This is because the valve 31 of the negative pressure suction source 17 comprises a thin film and the resistance of this valve is smaller than the air flow resistance at the pump suction openings 34. Therefore, ink may not be returned during the return movement of the lever 13 but is held by suction so as to seal the suction paths 11 and 25 by means of the ink suction hollow shaft 15 and the air suction hollow shaft 26. Each subtank receives ink from the corresponding main tank (now shown) to balance the pressure therein.

The present invention is not limited to a sealed ink tank but may also be applied to an open ink tank.

According to the embodiment of the present invention as described above, mixing of different color inks by suction of air may be prevented.

Since a separate negative pressure suction source for air suction only need not be included and an air suction tube need not be mounted on the subtank, the apparatus of the present invention may be made compact in size. In an apparatus wherein a subtank is mounted on the carriage, the air suction tube is not required, and carriage travel may be fast and stable.

Figure 7:
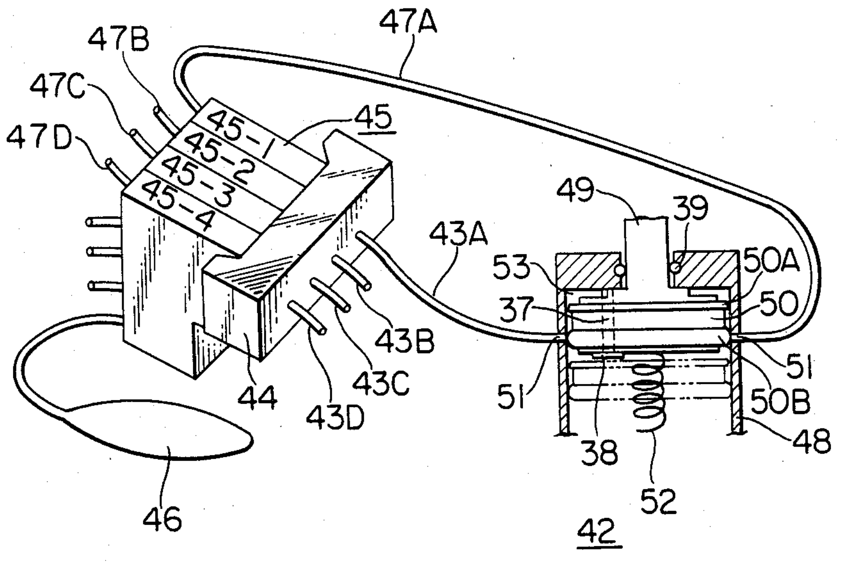
Figure 8:
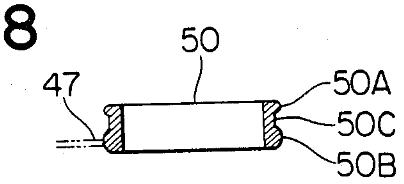
Figure 9:
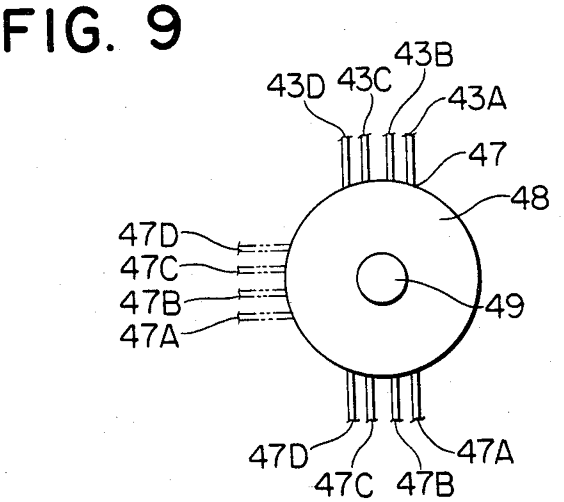

FIGS. 7 to 9 show the second embodiment of the present invention. Referring to FIG. 7, a cap 44 is connected to a negative pressure suction source 42 as a suction apparatus main body through flexible connecting tubes 43A to 43D for ink suction. A multinozzle head 45 as a recording head has four sealed subtanks 45-1 to 45-4 arranged next to each other. Inkjet nozzles for ink injection are arranged in the respective subtanks. An independent main tank (only 46 is shown) is connected to each subtank, which receives ink therefrom. Flexible air suction tubes 47A to 47D for air suction are connected to the subtanks 45-1 to 45-4 in order to draw the air therefrom. The respective tubes 47A to 47D are connected to the negative pressure suction source 42. When printing is not performed, the multinozzle head as described above has the cap 44 mounted on its distal end surface in a sealed state, thus preventing drying out of the nozzles of the head. The negative pressure suction source 42 mainly comprises a cylinder 48 and a piston 49. The piston 49 moves to produce a negative pressure so as to draw the inks from the respective nozzles through the tubes 43A to 43D and to draw the air from the subtanks through the air suction tubes 47A to 47D. A press button (not shown) is arranged above the piston 49. A cylinder sealing member 50 of an elastic material such as rubber is fitted in a portion of the piston 49. As shown in FIG. 8, the sealing member 50 has a ring shape with two annular ribs 50A and 50B which are in tight contact with the inner wall of the cylinder. The thickness of the rib 50B is greater than the diameters of suction openings 51 formed in an array around the circumference of the cylinder 48, so that the ink suction tubes 43A to 43D and the air suction tubes 47A to 47D may be sealed. A coil spring 52 serves to constantly urge the piston 49 upward. The apparatus further has an O-ring 39, an outlet port 37, and a check valve 38. When the piston 49 is moved upward from its lowermost position by the biasing force of a spring 52, the check valve 38 is opened. Ink which has been drawn into the cylinder 48 through the ink suction tubes 43A to 43D or the air suction tubes 47A to 47D is exhausted downward through the outlet port 37.

FIG. 7 shows a state wherein the distal ends of the nozzles of the head 45 are sealed by the cap 44 and the ink and air may be drawn by moving the piston 49 downward, and also a state wherein the piston 49 is returned to its original position by the spring 52 after drawing of the ink and air. When the piston 49 is at its lowermost position and the sealing member 50 is at the position indicated by the alternate-long-and-two-short-dashed line, a space 53 defined by the cylinder inner wall, the O-ring 39 and the piston 49 expands. The valve 38 is closed to produce a negative pressure. Then, inks of different colors flow from the subtanks 45-1 to 45-4 into the ink suction tubes 43A to 43D and the air suction tubes 47A to 47D. When the piston 49 is returned to its original position while the ink suction tubes 43A to 43D are kept at the negative pressure and before the space 53 is filled with the inks, the ink suction tubes 43A to 43D may be kept at the negative pressure when the upper rib 50A of the sealing member 50 passes by the suction openings 51. If grease is filled in a recess 50C of the sealing member 50B shown in FIG. 3, the piston 49 can maintain a negative pressure in the ink suction tubes 43A to 43D even when it is moved upward by one stroke to the position indicated by the solid line in FIG. 7, by means of the spring 52. The inks in the space 53 are exhausted through the outlet port 37 when the piston returns to its original position. At this time, the outer circumferential surface of the lower rib 50B of the sealing member 50 closes the suction openings 51. When the suction openings 51 are closed under the negative pressure, the ink continues to be drawn by suction from the subtanks and nozzles, which are kept substantially at atmospheric pressure. Thus, the meniscus at each nozzle is kept normal, and ink injection may be properly performed. When the apparatus is left in the state shown in FIG. 7, all the ink suction tubes 43A to 43D and all the air suction tubes 47A to 47D are kept isolated by the lower rib 50B of the sealing member 50, so that mixing of different color inks may be prevented.

The suction openings 51 may be formed at any position on the outer circumferential surface of the cylinder 48. Therefore, the ink suction tubes 43A to 43D and the air suction tubes 47A to 47D may be arranged close to each other as indicated by broken lines indicating the position of the latter in FIG. 9, so that the ink and air suction tubes may be arranged in a compact manner. Each suction opening 51 need only have a diameter of 0.5 mm, and the lower rib 50B of the sealing member 50 need only have a thickness of 1 mm. Accordingly, the sliding resistance of the piston may be reduced to the minimum.

In accordance with the embodiment of the present invention as described above, since the sealing member of the piston closes the suction opening of the cylinder, mixing of the different color inks may be prevented. Furthermore, since the arrangement of the suction openings may be freely selected, the ink and air suction tubes may be easily mounted and the sliding resistance of the piston may be reduced to the minimum.

What is claimed is:

1. An inkjet printer comprising:

a plurality of storing means storing inks of different colors;

a plurality of recording means for ejecting the inks stored in said storing means;

a plurality of air suction paths which are disposed in correspondence with said storing means for drawing air in said storing means and which are independent from each other and do not communicate with each other; and single suction means for drawing by suction the air from said storing means through said air suction paths in a suction mode, and for sealing said air suction paths to seal communication between said air suction paths in a non-suction mode.

2. An inkjet printer according to claim 1, wherein said printer further comprises ink suction paths which are disposed in correspondence with said recording means and are independent from each other and do not communicate with each other, said suction means drawing by suction the air and the inks through said air suction paths and said ink suction paths, respectively, in the suction mode, and sealing said air suction paths and said ink suction paths in the non-suction mode.

3. An inkjet printer according to claim 2, wherein said printer further comprises means for sealing an ejecting end each of said recording means, said air suction paths and said ink suction paths being disposed in said sealing means.

4. An inkjet printer according to claim 3, wherein said sealing means is shiftable between a position to seal said recording means and a position to open said recording means, and said suction means includes means for opening/closing said air suction paths and said ink suction paths in cooperation with a shifting operation of said sealing means.

5. A suction apparatus for an ink jet printer, comprising:

a plurality of suction paths which are disposed in correspondence with a plurality of recording means for ejecting inks and are independent from each other and do not communicate with each other; and a suction source for drawing by suction at least the inks through said suction paths, said suction source including:

a cylinder member to which said suction paths are connected at respective suction openings, and a piston member which is fitted inside said cylinder member to slide therealong for producing a negative pressure in said cylinder member, and said piston member having a rib for sealing said plurality of suction openings, and said rib having a width which is greater than the inner diameter of each of said suction openings.

6. A suction apparatus according to claim 5, wherein said suction openings are disposed in an array on a circumferential surface of said cylinder member.

7. A suction apparatus according to claim 6, wherein said apparatus further comprises means for biasing for returning said piston member to said predetermined position.

8. A suction apparatus according to claim 5, wherein, said apparatus further comprises means for biasing for returning said piston member to said predetermined position.

9. A suction apparatus according to claim 5, wherein said apparatus further comprises means for biasing for returning said piston member to said predetermined position.

* * * * *

UNITED STATES PATENT AND TRADEMARK OFFICE

CERTIFICATE OF CORRECTION

PATENT NO. : 4,510,510

DATED : April 9, 1985

INVENTOR(S) : KOJI TERASAWA

It is certified that error appears in the above-identified patent and that said Letters Patent is hereby corrected as shown below:

On the cover page, under the heading: Foreign Application Priority Data, change the date of priority for document No. 57-61530 from "Apr. 13, 1983" to --Apr. 13, 1982--.

Signed and Sealed this

*Twenty-first* Day of *January 1986*

[SEAL]

*Attest:*

DONALD J. QUIGG

*Attesting Officer* *Commissioner of Patents and Trademarks*